United States Patent
Uemura et al.

(10) Patent No.: US 11,025,874 B2
(45) Date of Patent: Jun. 1, 2021

(54) IMAGE PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Shinichi Uemura, Kawasaki (JP); Sonoko Miyatani, Tokyo (JP); Eisaku Tatsumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/442,702

(22) Filed: Jun. 17, 2019

(65) Prior Publication Data

US 2020/0007834 A1   Jan. 2, 2020

(30) Foreign Application Priority Data

Jun. 29, 2018   (JP) .............................. JP2018-125286

(51) Int. Cl.
  *G06K 9/00*   (2006.01)
  *H04N 9/31*   (2006.01)

(52) U.S. Cl.
  CPC ................................ *H04N 9/3185* (2013.01)

(58) Field of Classification Search
  CPC .. G06T 5/40; G06T 5/001; G06T 5/50; G06T 5/20; H04N 5/20; H04N 9/31; H04N 9/3185
  See application file for complete search history.

(56) References Cited

U.S. PATENT DOCUMENTS

| | | | | |
|---|---|---|---|---|
| 5,105,075 A * | 4/1992 | Ohta | ................... | G03F 7/70258 250/201.2 |
| 5,153,898 A * | 10/1992 | Suzuki | ................... | B82Y 10/00 378/34 |
| 6,369,814 B1 * | 4/2002 | Dorbie | ................... | G06T 5/006 345/419 |
| 7,907,795 B2 | 3/2011 | Hardy et al. | | |
| 8,109,639 B2 * | 2/2012 | Furui | ................... | H04N 9/3185 353/69 |

(Continued)

FOREIGN PATENT DOCUMENTS

JP   2001051346 A   2/2001

*Primary Examiner* — Amir Alavi
(74) *Attorney, Agent, or Firm* — Carter, DeLuca & Farrell LLP

(57) ABSTRACT

An image processing apparatus that determines a correction parameter for correcting distortion or a position of an image projected on a screen by a projection unit, the apparatus comprises a holding unit which holds a reference pattern constituted by a background region and a plurality of significant pixels scattered in the background region and having a pixel value different from a pixel value of the background region, a generating unit which generates a pattern image to be projected by changing a value of a pixel near the significant pixel in the reference pattern, an acquisition unit which acquires a captured image obtained by an image capturing unit by capturing the pattern image generated by the generating unit so as to include a projection image projected by the projection unit, and a determining unit which determines the correction parameter from the captured image.

20 Claims, 16 Drawing Sheets

(56) References Cited

U.S. PATENT DOCUMENTS

| | | | |
|---|---|---|---|
| 8,111,336 B2* | 2/2012 | Freeman | H04N 9/3194 |
| | | | 348/746 |
| 8,223,275 B2* | 7/2012 | Ehara | H04N 9/3185 |
| | | | 348/746 |
| 8,328,366 B2* | 12/2012 | Nara | H04N 9/3194 |
| | | | 353/69 |
| 8,403,500 B2* | 3/2013 | Todoroki | H04N 9/3194 |
| | | | 353/69 |
| 9,443,294 B2* | 9/2016 | Sumiyoshi | G06T 5/006 |
| 9,551,918 B2* | 1/2017 | Ouchi | G03B 21/147 |
| 9,762,850 B2 | 9/2017 | Tatsumi | |
| 9,967,531 B2 | 5/2018 | Uemura et al. | |
| 10,059,002 B2 | 8/2018 | Miyatani et al. | |
| 2016/0282707 A1 | 9/2016 | Tatsumi | |
| 2019/0206027 A1 | 7/2019 | Uemura et al. | |
| 2019/0364253 A1 | 11/2019 | Miyatani et al. | |
| 2020/0007834 A1* | 1/2020 | Uemura | H04N 9/3185 |

* cited by examiner

PATTERN IMAGE
(41×41)

F I G. 7A PATTERN IMAGE (41×41)
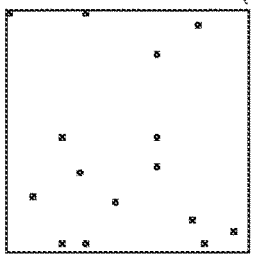
F I G. 7B PATTERN IMAGE THREE TIMES ENLARGEMENT (123×123)
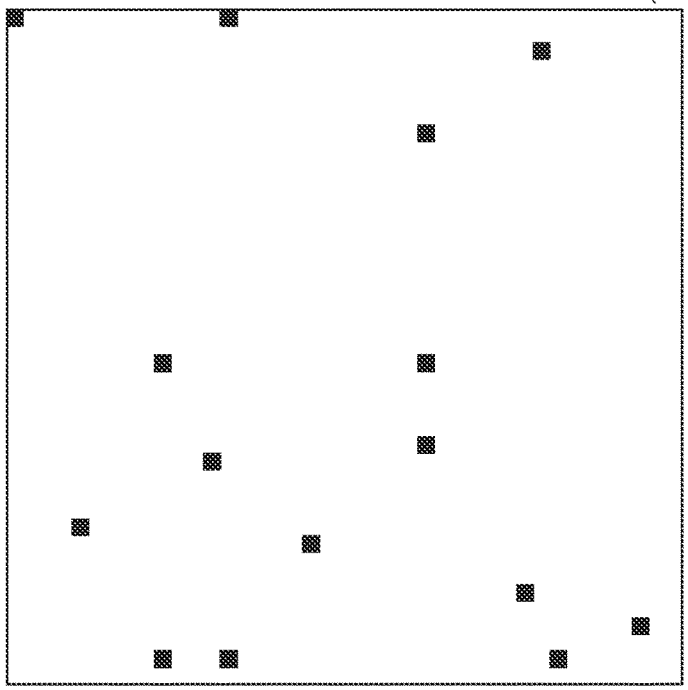
F I G. 7C PATTERN IMAGE (123×123)
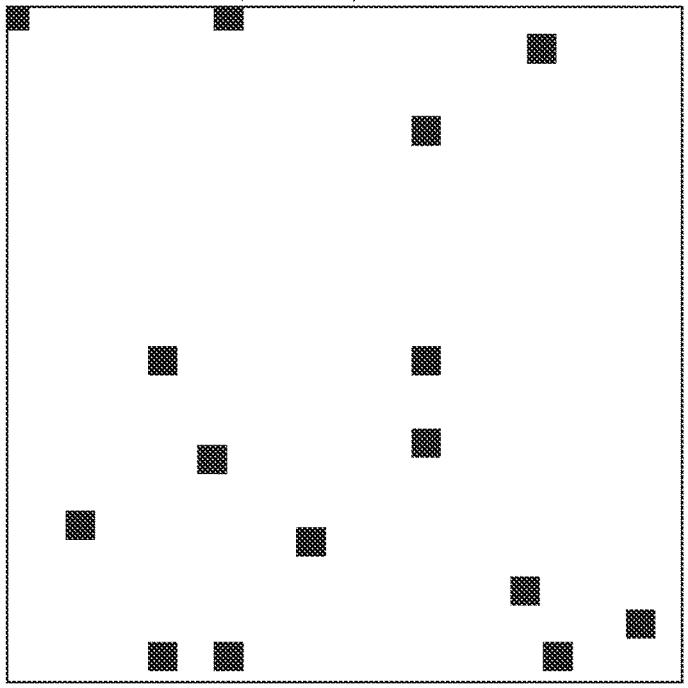

IMAGE PROCESSING APPARATUS, CONTROL METHOD, AND NON-TRANSITORY COMPUTER-READABLE STORAGE MEDIUM

BACKGROUND OF THE INVENTION

Field of the Invention

The present invention relates to a technique of displaying a video by projection.

Description of the Related Art

In recent years, projection systems, each using a plurality of projection apparatuses, have been permanently installed in, for example, in amusement facilities, museum exhibitions, and the like. A challenge to such a permanently installed projection system is to accurately align projection images from a plurality of projection apparatuses with each other. Accordingly, there is available a technique of projecting adjustment patterns from projection apparatuses to image-capture the patterns by a camera, generating adjustment parameters by analyzing the captured images, and aligning the images by correcting projected shapes on a screen. When, however, the resolution of an image capturing camera is insufficient with respect to the size of this adjustment pattern, alignment failure and accuracy deterioration occur. Accordingly, Japanese Patent Laid-Open No. 2001-051346 discloses a method of enlarging and capturing an image of a region with an image capturing camera when the resolution of the camera is insufficient with respect to the size of an adjustment pattern.

When, however, the image capturing camera enlarges an image of an adjustment pattern to capture an enlarged image of the pattern, a pattern image is partly missing. This reduces the amount of information obtained from the pattern, resulting in failure to perform accurate position adjustment.

SUMMARY OF THE INVENTION

According to an aspect of the present invention, there is provided an image processing apparatus that determines a correction parameter for correcting distortion or a position of an image projected on a screen by a projection unit, the apparatus comprising: a holding unit configured to hold a reference pattern constituted by a background region and a plurality of significant pixels scattered in the background region and having a pixel value different from a pixel value of the background region; a generating unit configured to generate a pattern image to be projected on the projection unit by changing a pixel value of a pixel near the significant pixel in the reference pattern; an acquisition unit configured to acquire a captured image obtained by an image capturing unit by capturing the pattern image generated by the generating unit so as to include a projection image projected by the projection unit; and a determining unit configured to determine the correction parameter from the captured image.

The present invention can provide a projection system that can perform accurate position adjustment of projection units and has good display quality.

Further features of the present invention will become apparent from the following description of exemplary embodiments (with reference to the attached drawings).

BRIEF DESCRIPTION OF THE DRAWINGS

FIGS. 7A to 7C are views for explaining an outline of image processing according to the second embodiment;

DESCRIPTION OF THE EMBODIMENTS

Embodiments of the present invention will be described below in detail with reference to the accompanying drawings. An arrangement according to each embodiment described above is merely exemplary, and the present invention is not limited to any arrangement shown in the accompanying drawings.

First Embodiment

Figure 2A:
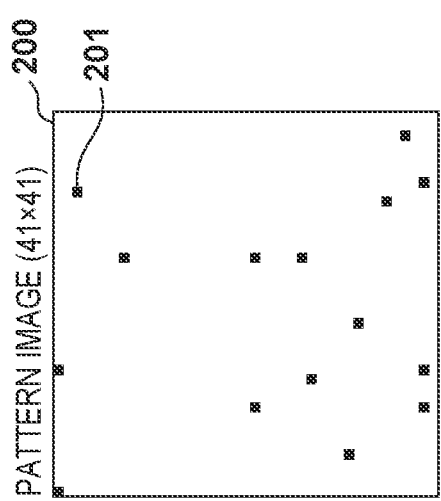
FIGS. 2A to 2D are views for explaining a problem in the first embodiment.
Figure 2B:
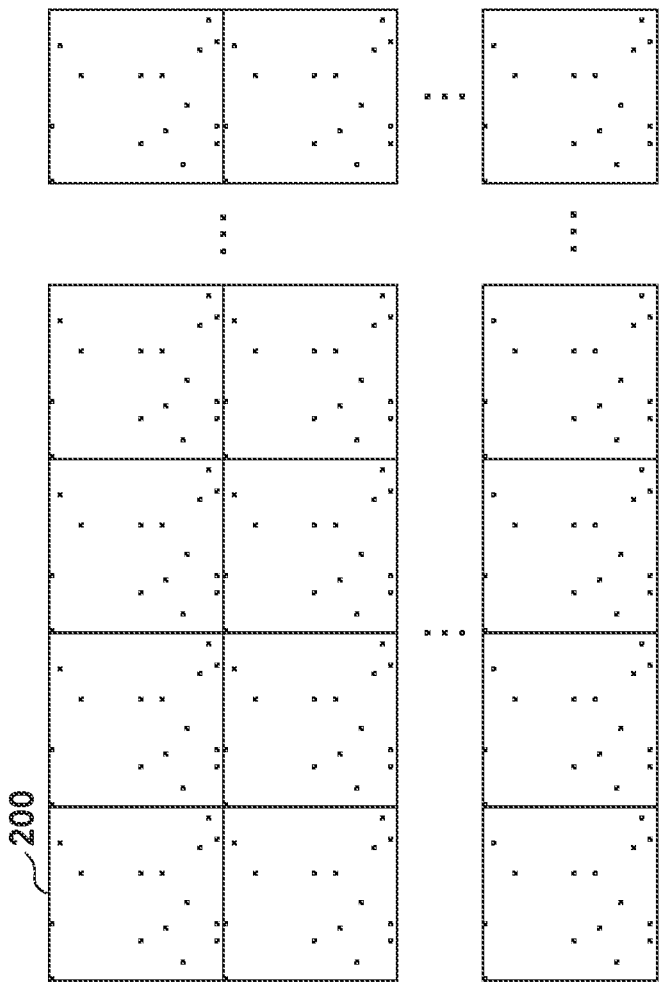
Figure 2C:
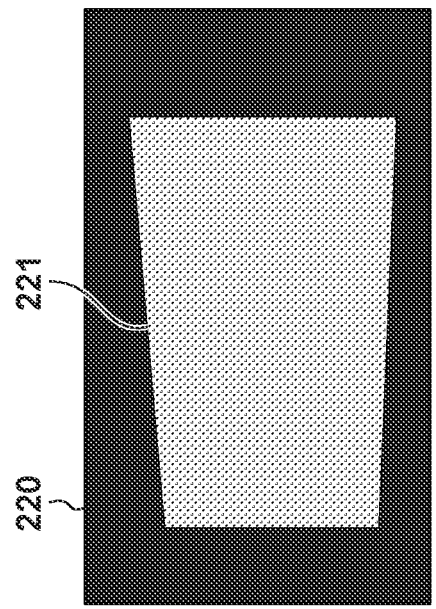
Figure 3:
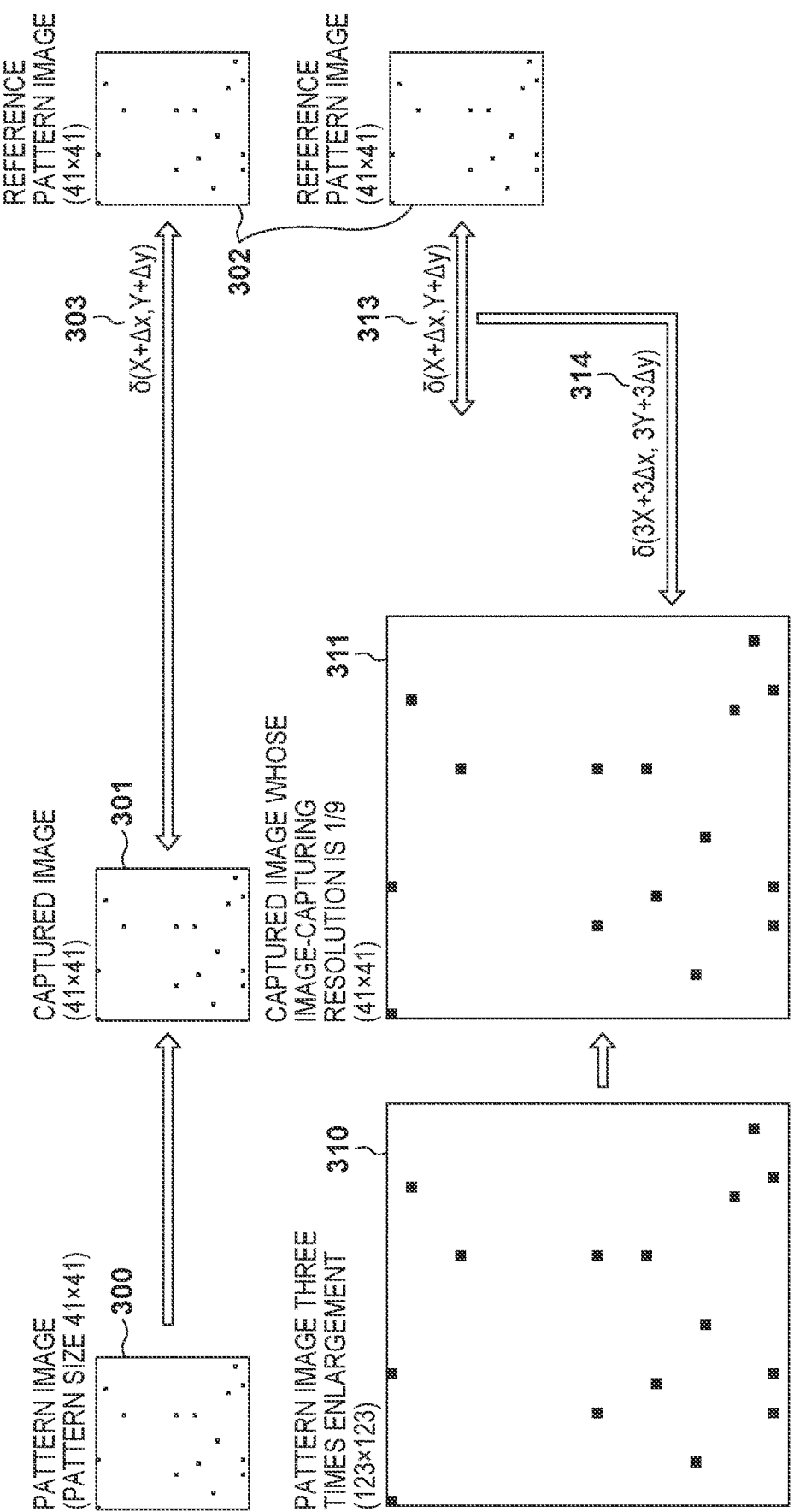
FIG. 3 is a view for explaining a problem in the first embodiment.
Figure 4B:
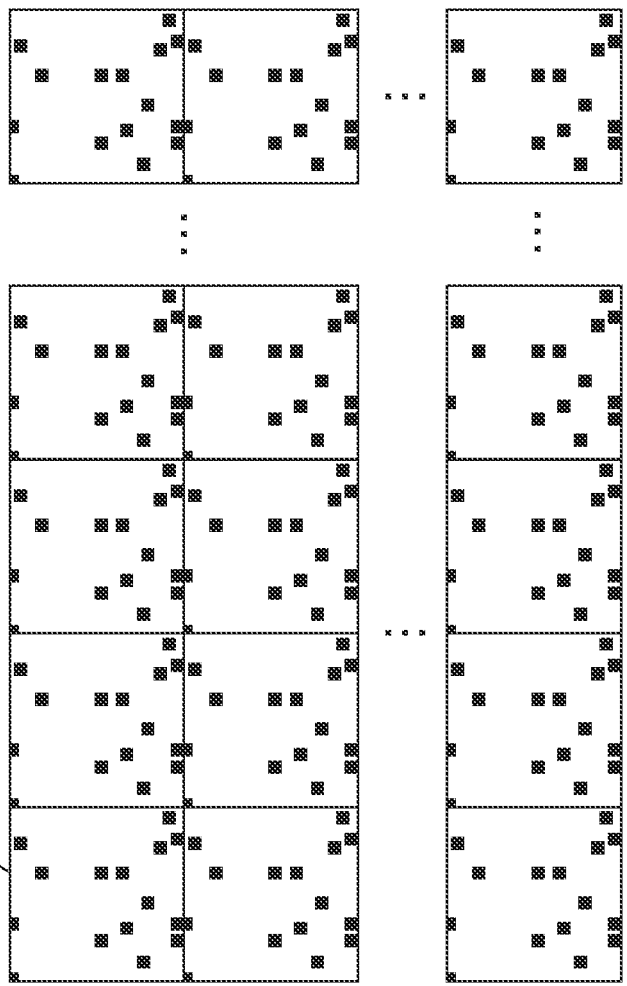
FIGS. 4A to 4D are views for explaining an outline of image processing according to the first embodiment.
Figure 4D:
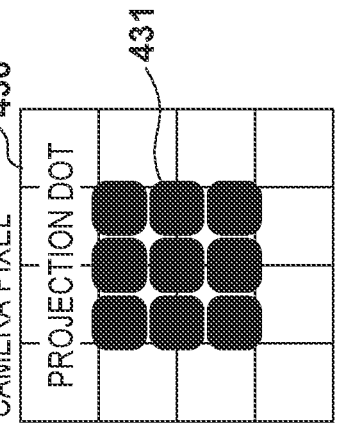
Figure 4A:
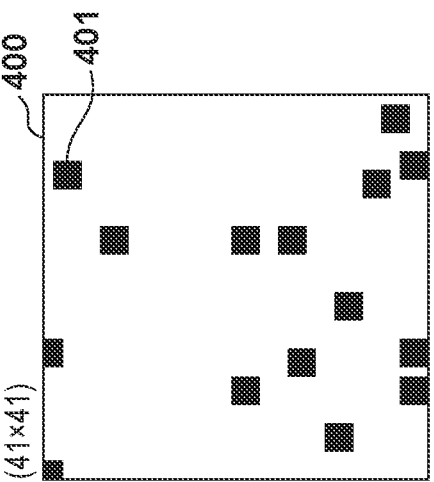
Figure 4C:
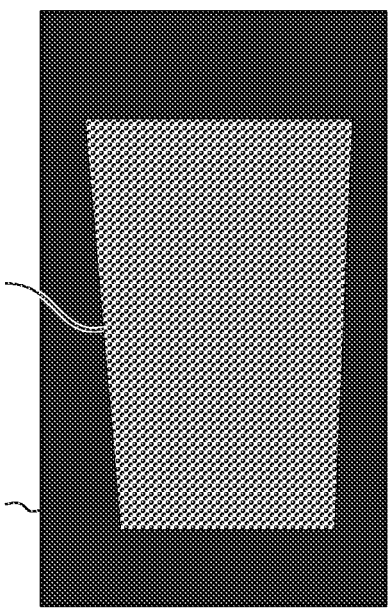

The first embodiment will be described below with reference to FIGS. 1 to 6. A supplementary explanation will be given in advance with reference to FIGS. 2A to 4B. FIGS. 2A and 2B show many black dots (including a representative pixel 201), each of which has a size corresponding to one pixel (1×1). Referring to FIG. 3, each black dot in pattern images 300, 301, 302, and 311 has a one-pixel size, and each black dot in a pattern image 310 has a size of 3×3 pixels. Referring to FIGS. 4A and 4B, assume that each black pixel (including a representative pixel 401) in a pattern image 400 has a size of 3×3 pixels.

Figure 1:
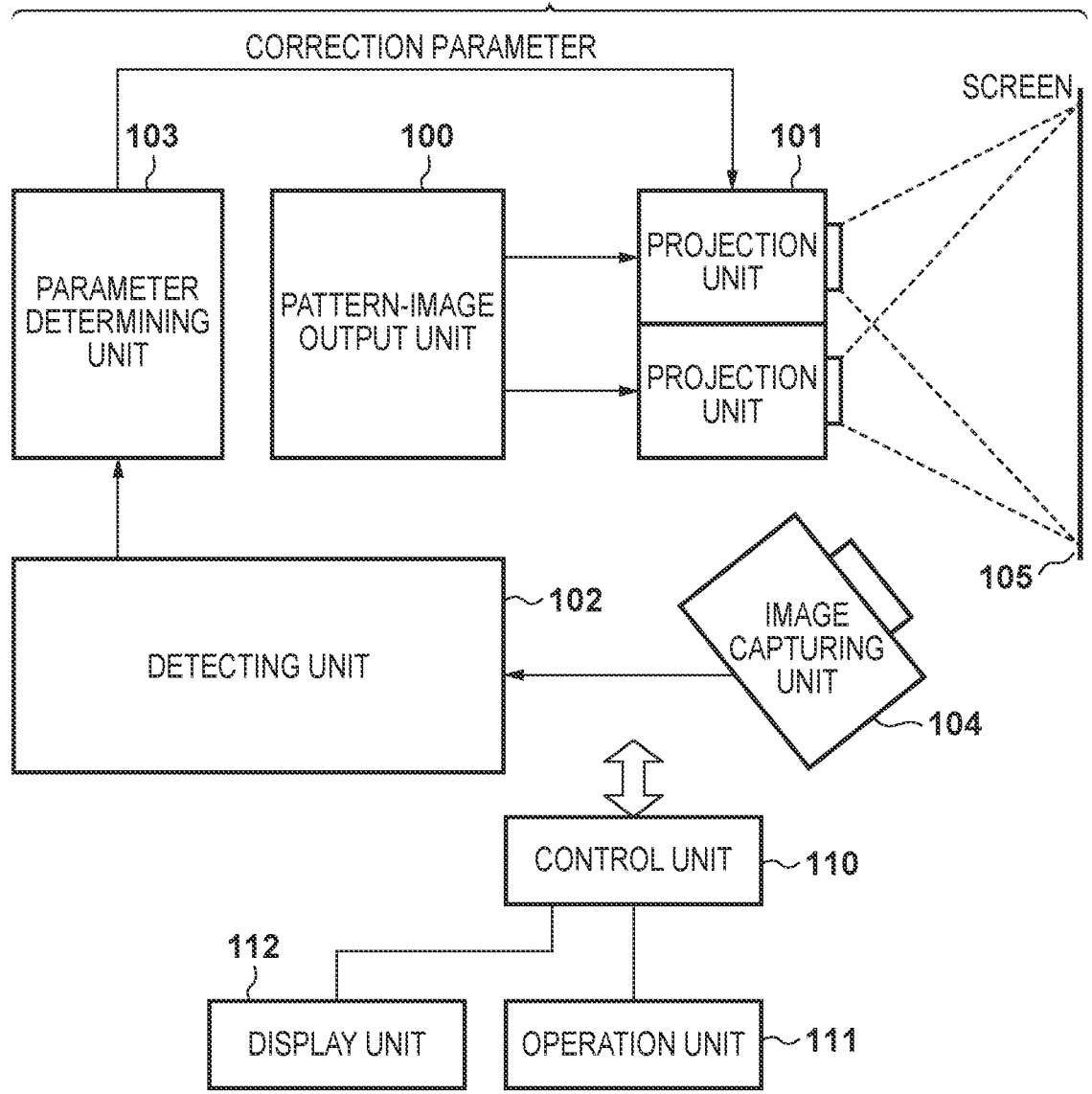
FIG. 1 is a block diagram showing the arrangement of a projection type display system according to the first embodiment.

FIG. 1 is a block diagram showing the arrangement of an image processing system associated with projection type display according to the first embodiment. This system includes a control unit 110 that controls the overall system, an operation unit 111 for receiving an instruction from the user, and a display unit 112 for notifying the user of each type of information. The control unit 110 includes a CPU, a ROM storing programs executed by the CPU, and a RAM used as a work area for the CPU. The operation unit 111 includes devices such as a keyboard and a mouse. The display unit 112 is a display device such as a liquid crystal display. This system further includes a pattern-image output unit 100, a projection unit (projection device) 101, a detecting unit 102, a parameter determining unit 103, and an image capturing unit (image capturing device) 104, which operate under the control of the control unit 110. The system includes a projection screen 105. Although FIG. 1 shows an example including two projection units, the number of projection units may be one or three or more and is not limited to any specific number. The pattern-image output unit 100, the detecting unit 102, and the parameter determining unit 103 may be respectively implemented by either dedicated hardware or software. In the latter case, the control unit 110 will implement each function.

As shown in FIG. 2A, the pattern-image output unit 100 acquires an N×N pixel pattern image 200 (N×N pixels) constituted by a background region and a plurality of significant elements 201 that are scattered in the background region and have values different from the luminance value of the background region. Because correction parameters for correcting the distortion and position of the image projected by each projection unit 101 are obtained from the coordinate positions of the significant elements 201, the significant elements 201 will be written as specific image elements 201. The pattern-image output unit 100 may acquire the pattern image 200 from a memory (not shown) or from another apparatus via a communication network. Alternatively, the pattern-image output unit 100 may acquire drawing information for the generation of the pattern image 200 shown in FIG. 2A from a memory (not shown) and acquire the pattern image 200 by image processing based on the drawing information. Note that each specific image element 201 constituting the pattern image 200 is a dot pattern formed from one pixel. Referring to FIG. 2A, each specific image element is a black dot (minimum luminance), and the background region is white (maximum luminance). However, this relationship may be inverted. In addition, although the pattern image 200 has a square shape in this embodiment, the image may have a rectangular shape or another shape.

The pattern-image output unit 100 further generates the pattern image shown in FIG. 2B by repeatedly arranging the acquired pattern image 200, and outputs (or supplies) the pattern image to the projection unit 101. In this stage, the projection unit 101 projects the pattern image shown in FIG. 2B supplied from the pattern-image output unit 100 onto the projection screen 105 without any change. This pattern image is obtained by encoding specific pixel coordinate information necessary for position adjustment based on, for example, the technique disclosed in U.S. Pat. No. 7,907,795. Note that the pattern-image output unit 100 may be incorporated in the projection unit 101.

The image capturing unit 104 captures the pattern image projected on the projection screen 105, and supplies the obtained image data to the detecting unit 102. FIG. 2C shows an example of a captured image. As shown in FIG. 2C, the captured image includes a screen image 220 (the background of the projection surface) indicating the screen 105 and a projection pattern image 221.

An outline of the algorithm disclosed in U.S. Pat. No. 7,907,795, which is configured to project a predetermined pattern image, capture the pattern image, and detect the position of the projected image, will be described below with reference to FIG. 3. This algorithm uses a pattern image obtained by superimposing three types of pattern images having different sizes. These images have sizes disjoint from each other, and include, for example, a pattern image having a size of 41 dots (horizontal)×41 dots (vertical), a pattern image having a size of 45 dots (horizontal)×45 dots (vertical), and a pattern image having a size of 49 dots (horizontal)×49 dots (vertical). For the sake of descriptive convenience, this embodiment will be described by using only one predetermined pattern image.

Referring to FIG. 3, a pattern image 300 has a size of 41 dots (horizontal)×41 dots (vertical). Assume that the image obtained by capturing a projected image of this pattern image is an image 301. In this case, for the sake of descriptive convenience, assume that one pixel of a projected image can be image-captured by one pixel of the image capturing unit. A reference pattern image 302 having a size of 41 dots (horizontal)×41 dots (vertical) serves as a reference for the calculation of the position of the captured image 301. The reference pattern image 302 is identical to the pattern image 300.

When the captured image 301 and the reference pattern image 302 are dot by dot (equal in dot size in the horizontal and vertical directions), phase analysis in a frequency space is performed with the captured image 301 and the reference pattern image 302. A phase difference δ (X+Δx, Y+Δy) that is the information of a projection pixel position 303 is calculated, where X is a phase difference in the horizontal direction, Y is a phase difference in the vertical direction, Δx is an error difference of X, and Δy is an error difference of Y.

Figure 2D:
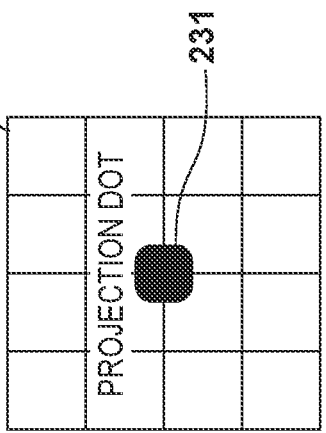

When the image capturing unit 104 captures the pattern image projected on the screen, the size of a dot as an element of the projection pattern image sometimes becomes larger than the size of a pixel 230 of the image capturing unit 104, as indicated by reference numeral 231 in FIG. 2D. In this case, the specific image element 231 cannot be properly detected, and hence the phase difference δ as projected pixel position information cannot be properly calculated.

As a method of solving this problem, there is conceivable a method of enlarging (three times in both the horizontal and vertical directions in FIG. 3) a pattern image like the image 310 up to a size larger than the pixel size of the image capturing unit 104. In order to calculate the phase difference δ as projected pixel position information, a captured image and a reference pattern image need to have a dot-by-dot relationship. Assume that the image 311 has been obtained with a camera whose resolution is ⅓ that of a projected pattern image. Because the resolution of the pattern image is ⅓ that of the camera in both the horizontal and vertical directions, the resolution of the captured pattern image becomes equal to 41×41 dots. In this case, the captured image 311 and the reference pattern image 302 are dot by dot, and hence phase analysis is performed without any change to calculate the phase difference δ (X+Δx, Y+Δy) denoted by reference numeral 313. According to this solution method, the calculated phase difference, that is, coordinate information, is coordinate information corresponding to ⅓ the original resolution in both the horizontal and vertical directions, and hence the calculation result needs to be multiplied by three to obtain an actual phase difference. As a result, the phase difference multiplied as indicated by reference numeral 314 is calculated as δ (3X+3Δx, 3Y+3Δy), and the error is expressed as 3Δx and 3Δy. That is, enlarging the pattern image will increase the error accordingly (three times in FIG. 3).

This embodiment solves such a problem. A specific example of the embodiment will be described below with reference to FIGS. 4A and 4B.

The pattern-image output unit 100 according to this embodiment acquires first the pattern image 200 serving as a reference constituted by N×N pixels shown in FIG. 2A. The pattern-image output unit 100 generates the pattern image 400 shown in FIG. 4A, which is obtained by substantially enlarging the specific pixel elements, by adding dots, each having a predetermined gray level, around each specific pixel element (each black pixel in this embodiment) without changing the size of the acquired pattern image 200 as a reference constituted by N×N pixels. The pattern-image output unit 100 generates the projected image shown in FIG. 4B by repeatedly arranging the generated pattern image 400, and outputs the image to the projection unit 101. The projection unit 101 projects the projected image input from the pattern-image output unit 100 onto the screen 105. The image capturing unit 104 captures the projected image projected on the screen 105. The image captured by the image capturing unit 104 is an image 420 in FIG. 4C. An image 421 is a projected image. In the projected image 420, the dot size represented by a specific pixel element is larger than a pixel size 430 of the image capturing unit 104, as indicated by reference numeral 431 in FIG. 4D, and hence allows easy detection. This allows the image capturing unit 104 to capture an image including specific image elements more properly than conventional devices. The detecting unit 102 can successfully detect the pattern. This makes it possible to properly calculate the phase difference δ as projected pixel position information. As a result, the parameter determining unit 103 can determine deformation parameters for the projected image by analyzing the detection result. This makes it possible to set correction parameters with high accuracy in the projection unit 101 at the time of actual projection.

The processing of generating the pattern image 400 by the pattern-image output unit 100 according to this embodiment will be described in more detail below.

Figure 5:
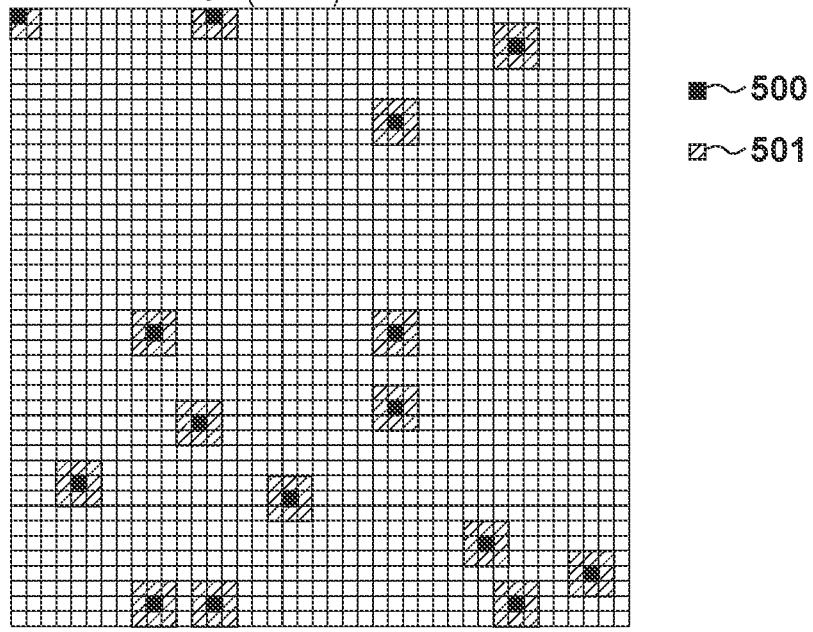
FIG. 5 is a view showing an example of the pattern image generated by image processing according to the first embodiment.

As shown in FIG. 5, the pattern-image output unit 100 adds pixels 501 around each specific pixel element 500 in the acquired pattern image 200 as a reference so as to make the pixel value of the specific pixel element 500 approach the background pixel value. The value of each pixel 501 to be added is, for example, the average value of the pixel value of the specific pixel element 500 and the pixel value of the background image. As a result, this can emphasize the center position of each dark pixel region and improve the accuracy of calculation of deformation parameters by the parameter determining unit 103 by suppressing the shift of the center position of the dot at the time of detection.

Although in this embodiment, each pixel 501 to be added to the specific pixel element 500 is set within a distance of one pixel from the specific pixel element 500, the pixel 501 may be set within a distance of two or more pixels.

Figure 6:
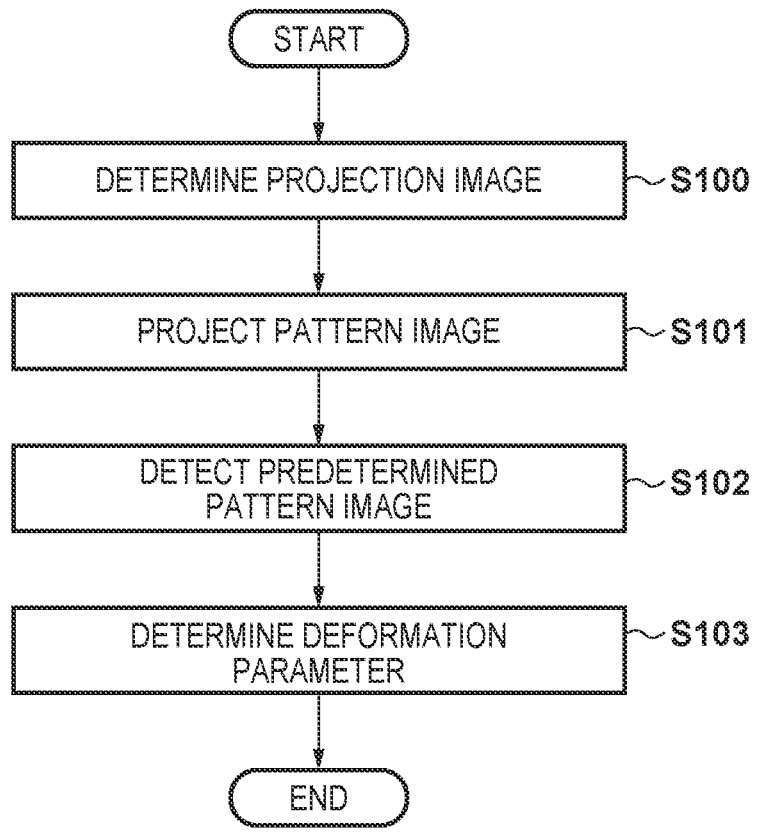
FIG. 6 is a flowchart showing an image processing procedure according to the first embodiment.

A processing procedure by the control unit 110 of the projection type display system according to this embodiment will be described next with reference to the flowchart of FIG. 6.

In step S100, the control unit 110 controls the pattern-image output unit 100 to acquire a pattern image as a reference and add pixels, each having a preset value, around the specific pixel elements 500 in the reference pattern image, thereby generating the pattern image 400 for projection. The control unit 110 then controls the pattern-image output unit 100 to repeatedly arrange a generated pattern image 4010 for projection, thereby generating a projected image.

In step S101, the control unit 110 performs projection control processing. More specifically, the control unit 110 controls the pattern-image output unit 100 to output the generated projected image to the generated projection unit 101, thereby projecting the projected image on the screen 105.

In step S102, the control unit 110 performs image-capturing control processing. More specifically, the control unit 110 controls the image capturing unit 104 to capture the projection image projected on the screen 105 and supply the captured image to the detecting unit 102. The control unit 110 controls the detecting unit 102 to detect a pattern image for projection in the captured image and supply the detection result to the parameter determining unit 103.

In step S103, the control unit 110 controls the parameter determining unit 103 to determine correction parameters for the deformation of the projected image when causing the projection unit 101 to project the image and set the determined correction parameters in the projection unit 101. Subsequently, the projection unit 101 corrects first the image data supplied from an external apparatus (not shown) in accordance with the correction parameters and then projects the image on the screen 105.

As described above, this embodiment is configured to change the size of each dot constituting a predetermined pattern image so as to properly capture a pattern with the camera. This enables accurate automatic position adjustment.

Second Embodiment

A supplementary explanation will be given below concerning FIGS. 7A to 7C referred to in the second embodiment. Although FIG. 7A shows many black dots in a pattern image, each black dot has a size of one pixel (1×1). Each black dot indicated in the pattern image in FIG. 7B has a size of 3×3 pixels. Each black dot indicated in the pattern image in FIG. 7C has a size of 5×5 pixels.

A system arrangement according to the second embodiment is the same as that according to the first embodiment. A pattern-image output unit 100 according to the second embodiment enlarges first a pattern image up to a size equal to an integer multiple of the size of a pattern image as a reference, and then adds pixels, each having a predetermined gray level, around each specific pixel element in the enlarged pattern image.

FIG. 7A shows a pattern image as a reference. When the number of pixels added around each specific pixel element in a pattern age as a reference is large or the dot density is high, the spaces among the specific pixel elements are eliminated, and dots sometimes overlap each other. Accordingly, the pattern-image output unit 100 according to the second embodiment enlarges a pattern image as a reference up to a size equal to a predetermined integer multiple (three times in both the horizontal and vertical directions in FIG. 7B). As shown in FIG. 7C, the pattern-image output unit 100 generates a pattern image for projection by adding pixels, each having a predetermined gray level, around each specific pixel element in the enlarged pattern image. Assume that the value of each pixel with a predetermined gray level to be added is the average value of the value of each specific pixel element and the value of a background pixel as in the first embodiment.

Changing the size of a reference pattern image in this manner makes it possible to prevent contact between dots upon dot addition and properly image-capture a pattern with the camera. This enables accurate automatic position adjustment.

Third Embodiment

A supplementary explanation will be given below concerning FIG. 9 referred to in the third embodiment. Many black dots are shown in each of pattern images 300, 301, 302, 304, 305, and 321 shown in FIG. 9. Each black dot has a size of one pixel (1×1). In addition, each black dot shown in each of pattern images 311 and 322 has a size of 3×3 pixels. Assume that each non-white dot (corresponding to each black dot and its surrounding hatched portion in FIG. 5) in the pattern image denoted by reference numeral 320 in FIG. 9 has a size of 3×3 pixels.

In the first embodiment, the pattern-image output unit 100 generates a pattern image for projection with substantially enlarged specific pixel elements by adding the pixels 501 within a preset distance from each specific pixel element in a pattern image as a reference.

However, the size of the image projected on the screen 105 depends on the distance between the projection unit 101 and the screen 105 and the optical system of the projection unit 101. Accordingly, the number of pixels 501 to be added is preferably changed in accordance with the situation instead of being fixed.

The third embodiment will therefore exemplify a case in which the number of pixels 501 to be added is changed in accordance with the situation of projection instead of being fixed.

Figure 8:
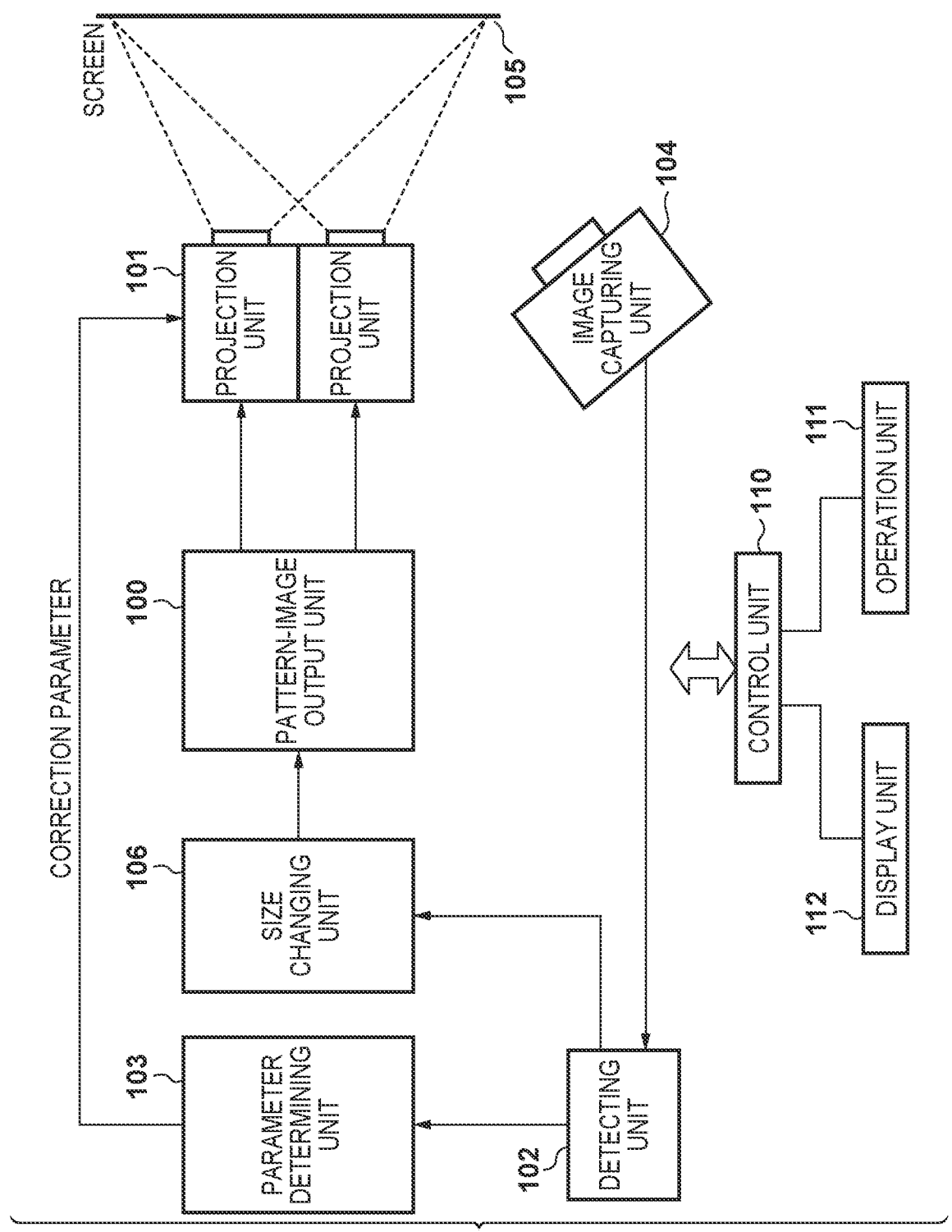
FIG. 8 is a block diagram showing the arrangement of a projection type display system according to the third embodiment.

FIG. 8 shows the arrangement of a projection type display system according to the third embodiment. The same reference numerals denote processing units having the same functions as those in FIG. 1, and a description of them will be omitted. FIG. 8 differs from FIG. 1 in that a size changing unit 106 is added, and the processing contents of the control unit 110 are changed.

In order to describe an example in which the third embodiment effectively functions, an application of the embodiment to a method of encoding and decoding the coordinate information of an image, which is disclosed in U.S. Pat. No. 7,907,795, will be described below. The technique disclosed in this patent literature uses the pattern obtained by superimposing three types of patterns having different sizes. These image sizes are disjoint from each other. For example, the pattern is constituted by three patterns including a pattern of 41×41 dots, a pattern of 45×45 dots, and a pattern of 49×49 dots. The influence caused when this algorithm is used to enlarge a pattern image will be described. For the sake of descriptive convenience, this embodiment will be described by using only one pattern of 41×41 dots.

Figure 9:
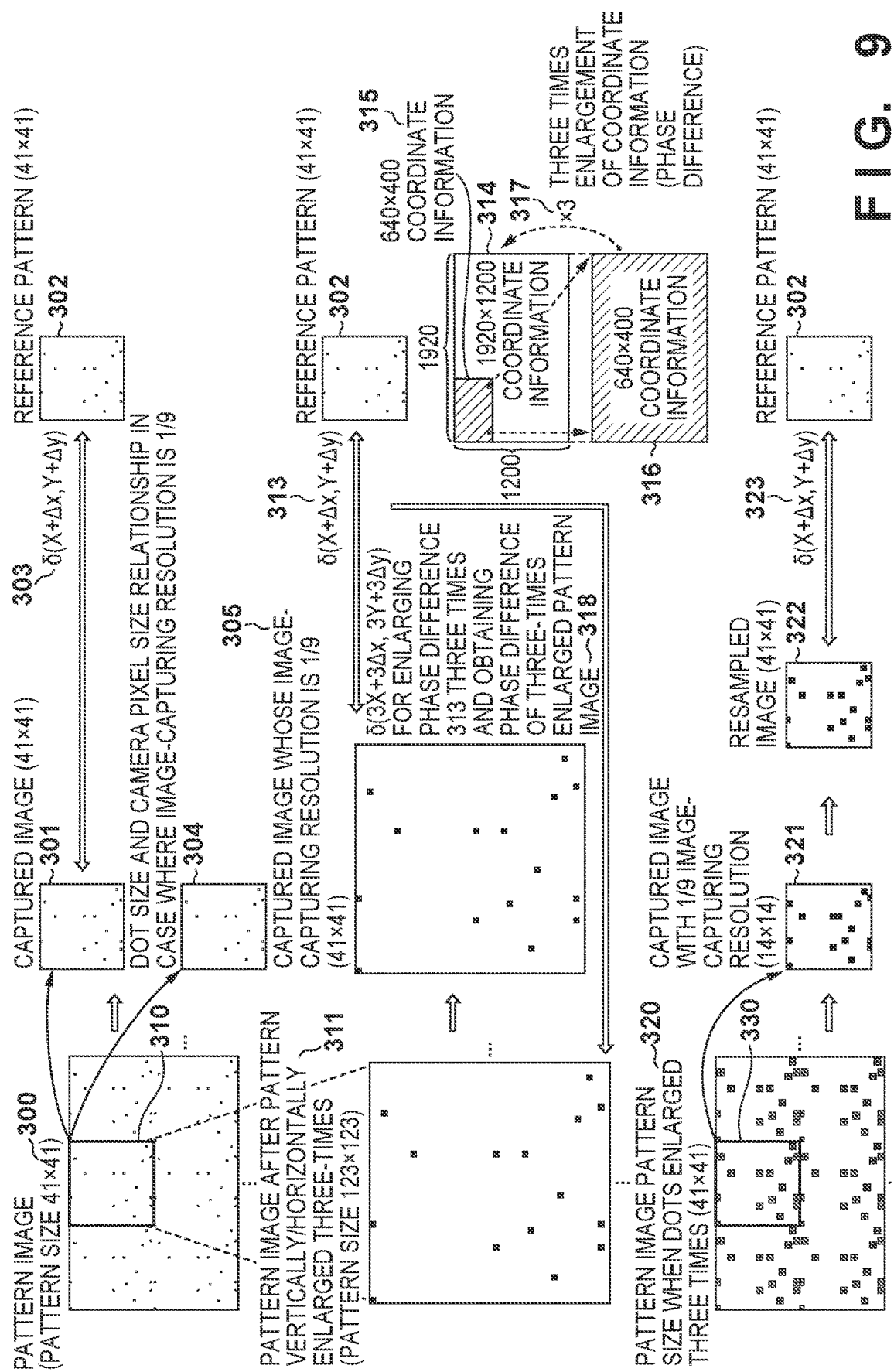
FIG. 9 is a view for explaining a problem in the third embodiment.

The image 300 in FIG. 9 is the pattern image obtained by repeatedly arranging and projecting a pattern of 41×41 dots. The image 301 is the image obtained by cutting out a region 310 from the captured image of the pattern image. For the sake of descriptive convenience, assume that one pixel of a projection image can be image-captured by one pixel of the image capturing unit. The reference pattern 302 is constituted by 41×41 dots and serves as a reference for the calculation of the position of a projection image. When the image 301 and the reference pattern image 302 are dot by dot (equal in dot size in the horizontal and vertical directions), phase analysis is performed by using the image 301 and the reference pattern image 302 without any change, thereby calculating a phase difference δ (X+Δx, Y+Δy) denoted by reference numeral 303. The phase difference δ represents the shift amount of the reference pattern in the captured image. X represents a phase difference in the horizontal direction. Y represents a phase difference in the vertical direction. In addition, Δx and Δy respectively represent error differences of X and at the time of calculation of phase differences. Encoded coordinate information is decoded based on this shift amount.

If, however, the size of each dot as a specific image element of a pattern is smaller than the pixel size of the image capturing unit, dots cannot be properly image-captured. For example, when the image 300 in FIG. 9 is captured with a camera whose image-capturing resolution is ⅓ that of the image, each dot becomes smaller than the pixel size as indicated by the mage 304. There is available a method of properly capturing an image by enlarging and projecting the size of the pattern on the projection side. The pattern image 311 is obtained by repeatedly arranging and projecting a pattern of 123×123 dots obtained by multiplying the size of the pattern by three in the horizontal and vertical directions. The image 305 is obtained by capturing an image of this pattern image with the camera whose resolution is ⅓ that of the image. The resolution of the captured image is ⅓ that of the original image in both the horizontal and vertical directions, and hence the captured pattern is equal to a pattern of 41×41 dots. In this case, because the captured image 305 and the reference pattern 302 are given dot by dot, phase analysis is performed without any change to calculate the phase difference δ (X+Δx, Y+Δy) indicated by reference numeral 313. According to this disclosed technique, however, the phase difference, that is, the coordinate information, calculated upon multiplying the pattern size by three becomes coordinate information whose resolution is ⅓ that of the original resolution. This operation will be described with reference to pattern images 314 to 316 in FIG. 9. The pattern image 314 is obtained by repeatedly arranging a pattern image of 41×41 dots. When the pattern image 314 has a resolution of 1,920×1,200, coordinate information corresponding to the resolution is encoded into a pattern image. When, however, the pattern size is multiplied by three, the pattern image 315 having coordinate information in a region of 640×400 is enlarged into the pattern image 316 of 1,920×1,200. Accordingly, in order to acquire coordinate information corresponding to a resolution of 1,920×1,200, the coordinate information acquired from the pattern image 316 needs to be multiplied by three in the horizontal and vertical directions. The phase difference calculated in this case is given by δ (3X+3Δx, 3Y+3Δy) indicated by reference numeral 318. In this case, not only the phase difference but also the error is multiplied by three, resulting in the error difference multiplied by three at the time of decoding.

In this embodiment, as indicated by a pattern image 320 in FIG. 9, the size of each specific image element constituting a pattern is changed into, for example, 3 dots×3 dots without changing the pattern size. The image 321 is Obtained by image-capturing this pattern image and cutting out a region 330. With this operation, the size of each element becomes equal to the size obtained by multiplying the pattern size by three times by the projection unit, thereby properly capturing an image. At this time, the size of the captured image 321 becomes ⅓ that of 41×41 dots in the horizontal and vertical directions, and hence becomes about 14×14 dots. The obtained image is then resampled into 41×41 dots as indicated by the image 322 to set a dot-by-dot relationship with the reference tile 302, thus calculating the phase difference δ (X+Δx, Y+Δy) indicated by reference numeral 323. The phase difference δ obtained by this method has not undergone pattern size enlargement, and hence need not be multiplied by a constant. Besides, no error difference of the coordinate information is enlarged.

Figure 10:
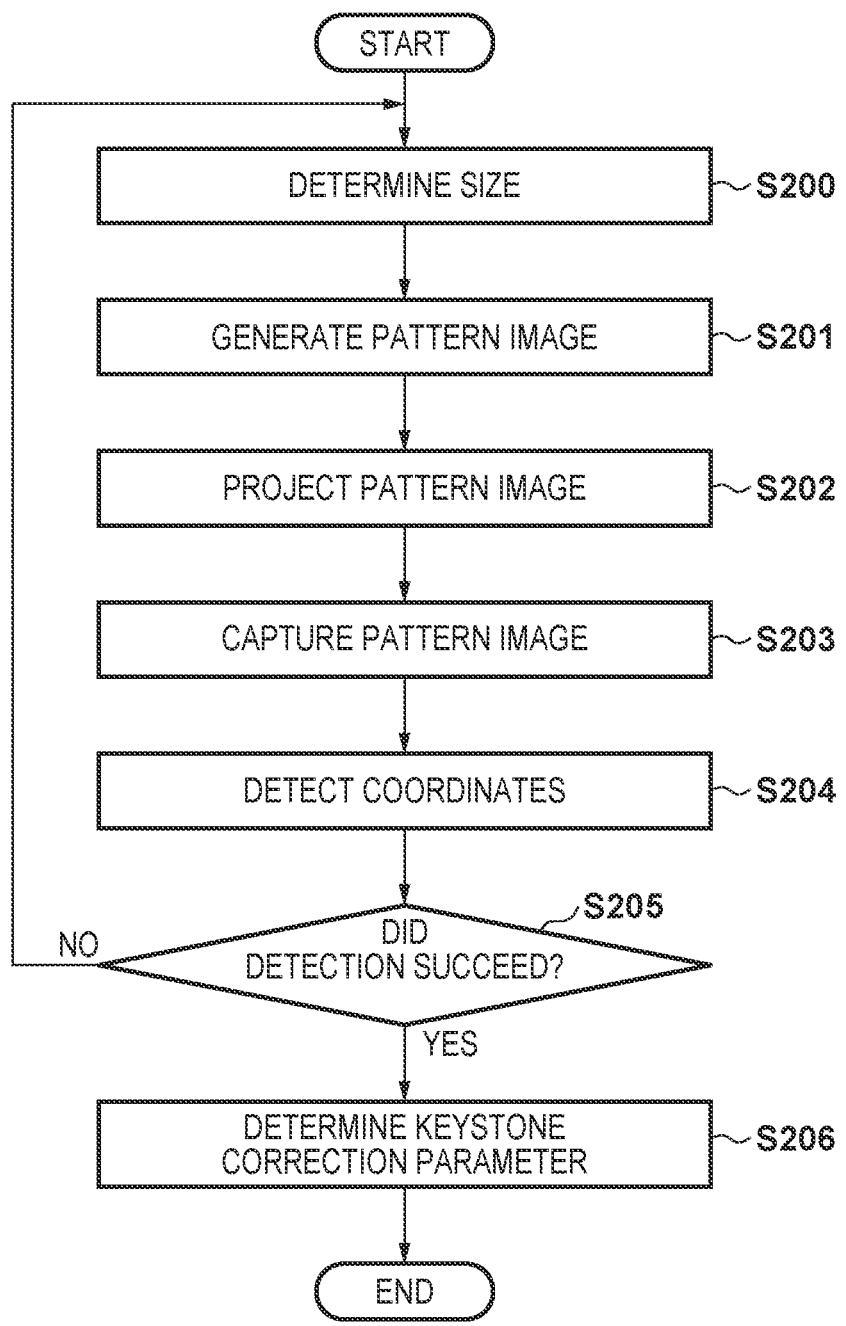
FIG. 10 is a flowchart showing an image processing procedure according to the third embodiment.

An outline of the above series of processing will be described next with reference to the flowchart of FIG. 10. The procedure starts in response to an instruction for distortion correction and alignment of each projection unit, which is issued by the user as a trigger via an operation unit 111.

In step S200, a control unit 110 controls a size changing unit 106 to change the size of each specific image element to the initial size by adding a preset number of pixels around the specific image element. Assume that the number of pixels to be added at the first execution of step S200 is "0". That is, a reference pattern image is used.

In step S201, the control unit 110 controls a pattern-image output unit 100 to perform the processing of generating a projected image pattern including specific image elements and output the pattern to the projection unit 101. In step S202, the control unit 110 controls the projection unit 101 to project the projection pattern image. In step S203, the control unit 110 controls an image capturing unit 104 to image-capture the screen on which the projection pattern image is projected. In step S204, the control unit 110 controls the image capturing unit 104 to decode and detect the coordinate information of each specific image element from the captured image. In step S205, the control unit 110 determines whether the detecting unit 102 has normally performed detection (detection success/failure). If NO in step S205, the control unit 110 returns the process to step S200 to increase the distance at which the pixel 501 is added to each specific image element by "1" with respect to previous projection. This increases the size of each specific image element from the initial 1 pixel to 3×3 pixels. The control unit 110 repeats the above processing. As a result, the size of each specific image element gradually increases until the detecting unit 102 can perform normal detection. If each specific image element can be normally detected, the control unit 110 advances the process to step S206.

In step S206, the control unit 110 controls a parameter determining unit 103 to determine distortion correction parameters for deformation from coordinate information and transmit the parameters to the projection unit 101, thereby completing distortion correction and alignment.

As described above, according to this embodiment, changing the size of each dot constituting a pattern image can properly image-capture a pattern with the camera, thereby enabling accurate automatic position adjustment.

Fourth Embodiment

Figure 11:
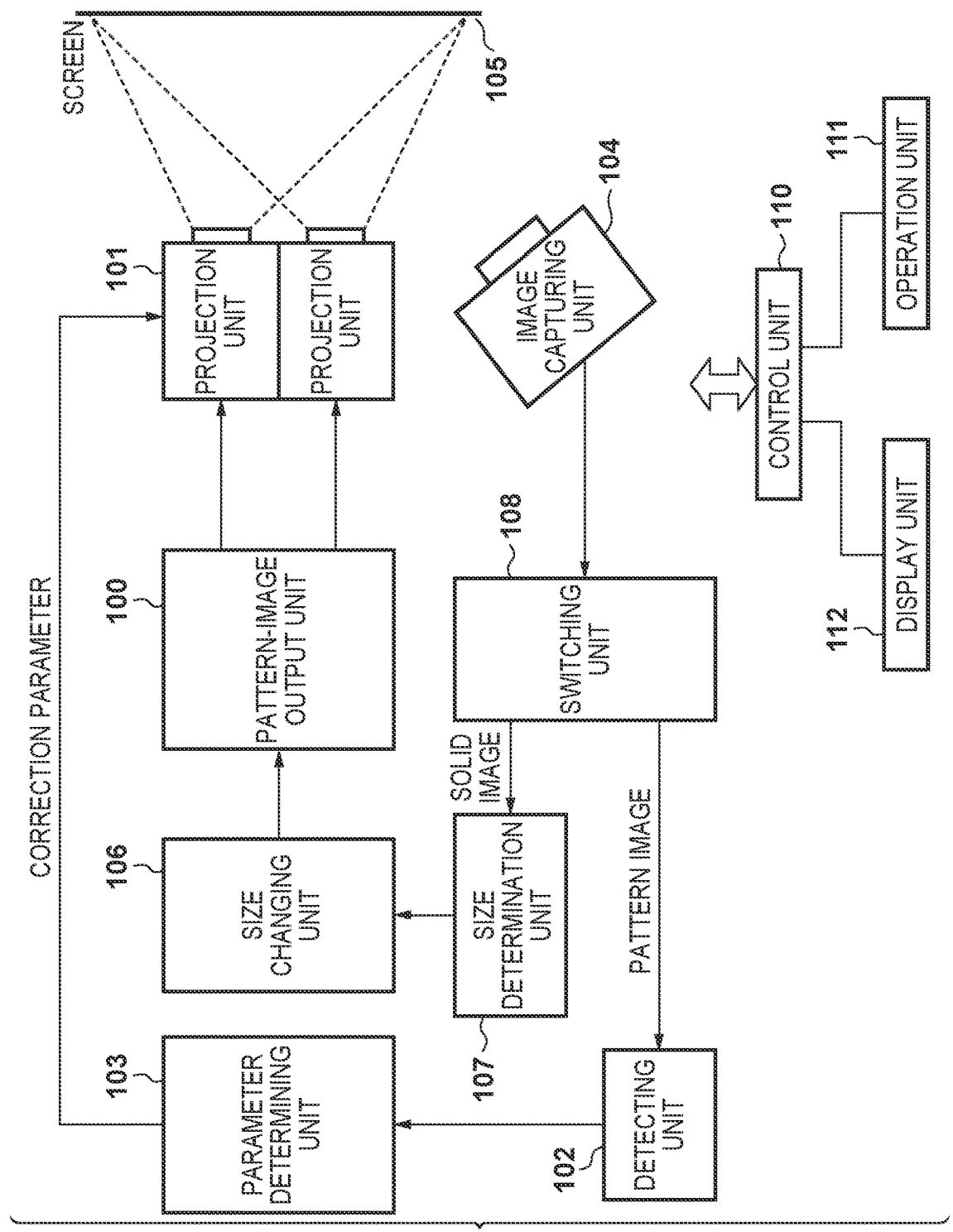
FIG. 11 is a block diagram showing the arrangement of a projection type display system according to the fourth embodiment.

FIG. 11 is a block diagram showing the arrangement of a projection type display system according to the fourth embodiment. This embodiment differs from the third embodiment in that a size determining unit 107 and a switching unit 108 are added, and the processing contents of a control unit 110 are changed. Assume that other processing units are the same as those in the third embodiment.

In the third embodiment, each specific image element is gradually increased from the initial size, and correction parameters are determined in accordance with the size corresponding to the timing when normal detection is performed. That is, the processing of changing the size of each specific image element is performed in multiple steps depending on the situation. Accordingly, this may prolong the time required to determine correction parameters.

The fourth embodiment is therefore configured to shorten the time until correction parameters are obtained, by automatically calculating the optimal size of each specific image element constituting a pattern before the projection of the pattern image and then projecting the pattern image including the specific image elements each having the calculated size. More specifically, the size of each specific image element is calculated by projecting and image-capturing an image for projection region determination and acquiring the projection region size. Note that a method of acquiring a projection region size is not limited to this, and the user may input a projection region size if it is known.

Figure 12:
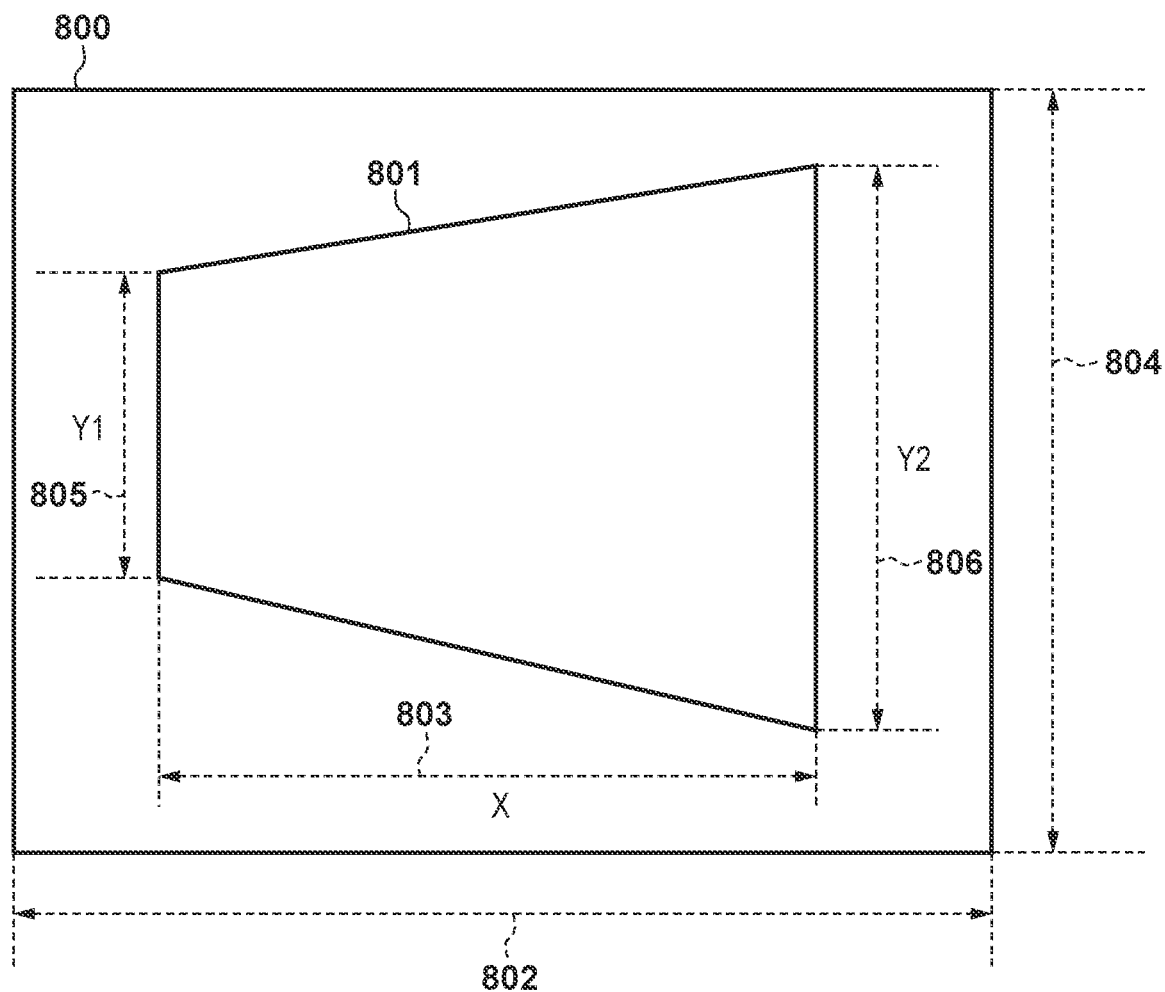
FIG. 12 is a view for explaining an outline of image processing according to the fourth embodiment.

A series of processing will be described with reference to FIGS. 11 and 12. First of all, the control unit 110 controls the pattern-image output unit 100 to generate a white solid image and output it to a projection unit 101. As a result, the projection unit 101 projects the white solid image on a screen 105. The control unit 110 controls an image capturing unit 120 to capture the white solid image. FIG. 12 shows a captured image 800 obtained in this case. The captured image 800 includes a white solid image 801 (serving also as a projection range) in the captured image. At this time, the control unit 110 controls the switching unit 108 to supply the white solid image to the size determining unit 107. The size determining unit 107 respectively calculates ratios X and Y of the white solid image to the captured image in the horizontal and vertical directions. Referring to FIG. 8, a ratio X 803 is the ratio of the white solid image to a size 802 of the captured image in the horizontal direction, and a ratio Y1 805 and a ratio Y2 806 are respectively the ratios of the white solid image to a size 804 of the captured image in the vertical direction. As indicated by reference numeral 801, when the captured white solid image is not rectangular, the ratios of the opposite sides sometimes differ from each other as indicated by Y1 and Y2. In this case, the ratio of a side is calculated by calculating an average value as indicated by equation (1) given below:

$$Y=(Y1+Y2)/2 \quad (1)$$

The optimal size of each specific image element is calculated by using equations (2) and (3):

$$\text{Size } X=[\text{desired image-capturing dot size}]\times[\text{resolution of projection unit 101 in horizontal direction}]/([\text{resolution of image capturing unit 104 in horizontal direction}]\times X) \quad (2)$$

$$\text{Size } Y=[\text{desired image-capturing dot size}]\times[\text{resolution of projection unit 101 in vertical direction}]/([\text{resolution of image capturing unit 104 in vertical direction}]\times Y) \quad (3)$$

In this case, the desired image-capturing dot size is a user parameter indicating a specific number of dots, converted into the number of pixels of the image capturing camera, which displays a dot as a specific image element projected from the projection unit 101. In general, the dot size is preferably 1.5 to 5 dots. SizeX represents the optimal number of dots for each specific image element in the horizontal direction, and SizeY represents the optimal number of dots in the vertical direction. Assume that a larger one of SizeX and SizeY is the optimal size of a specific image element calculated by the size changing unit 106.

Figure 13:
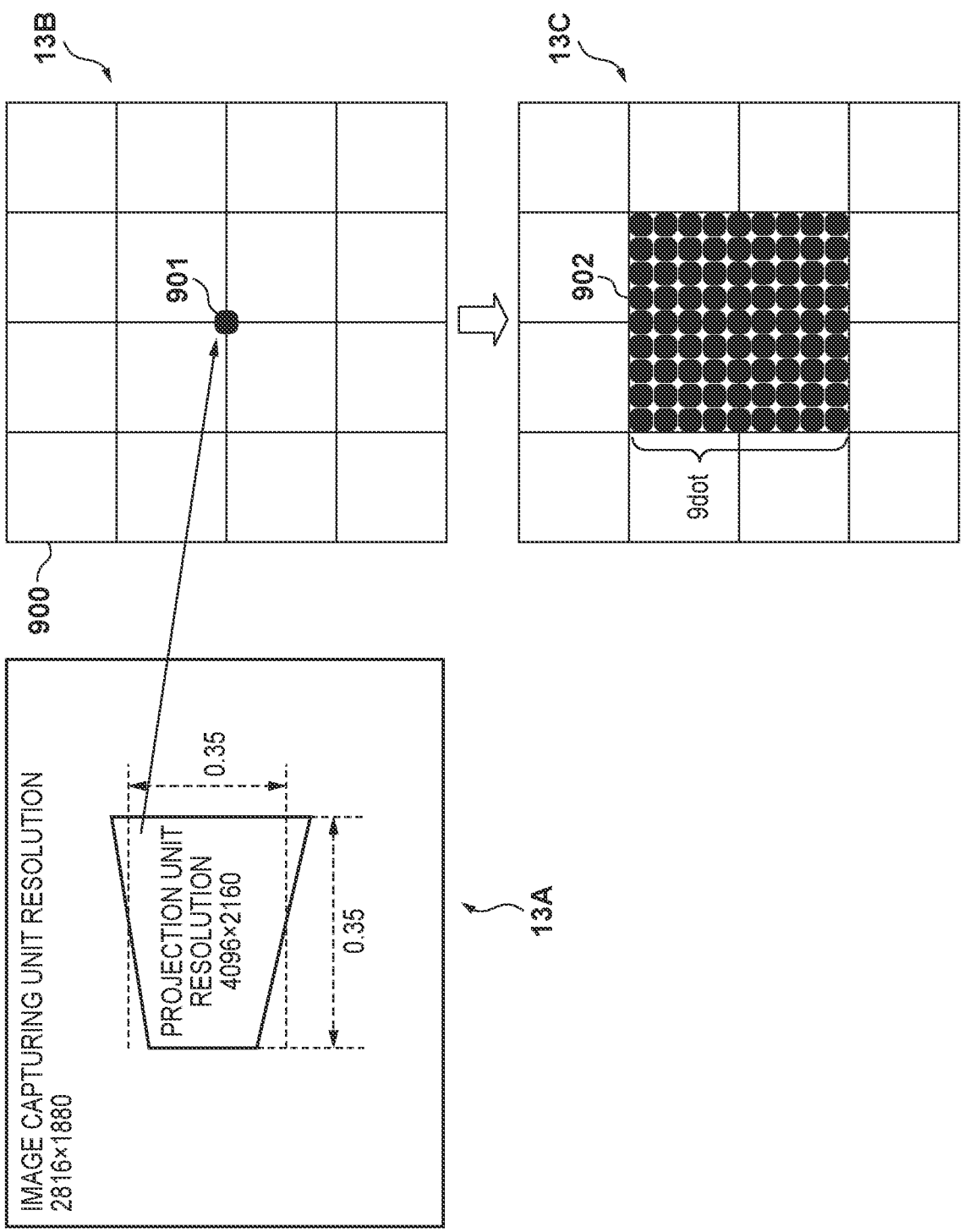
FIG. 13 explains an outline of image processing according to the fourth embodiment.

Specific processing will be described next with reference to FIG. 13. 13A in FIG. 13 shows a case in which the resolution of an image capturing unit 104 is 2,816 pixels (horizontal)×1,880 pixels (vertical), the resolution of the projection unit 101 is 4,096 pixels (horizontal)×2,160 pixels (vertical), and both the ratios X and Y of the white solid image in the horizontal and vertical directions are 35%. 13B in FIG. 13 shows the relationship between the dot size and the pixel size of the image capturing unit 104 when the projection unit 101 projects a 1-dot pattern as a specific image element.

A projection dot size 901 is about ⅕ a pixel size 900 of the image capturing unit 104. In this case, the optimal numbers of dots are calculated as SizeX=8.3 and SizeY=6.6 according to equations (2) and (3) using the respective parameters in 13A in FIG. 13, assuming that desired dot size=2. When SizeX which is the larger number of dots is selected and rounded off, the optimal sizes of each specific image element in both the horizontal and vertical directions are 9 dots. As shown in 13C in FIG. 13, dots are projected, with each dot having a size of two dots in terms of the pixel size of the image capturing unit 104, which is equal to the size designated by the desired dot size.

Figure 14:
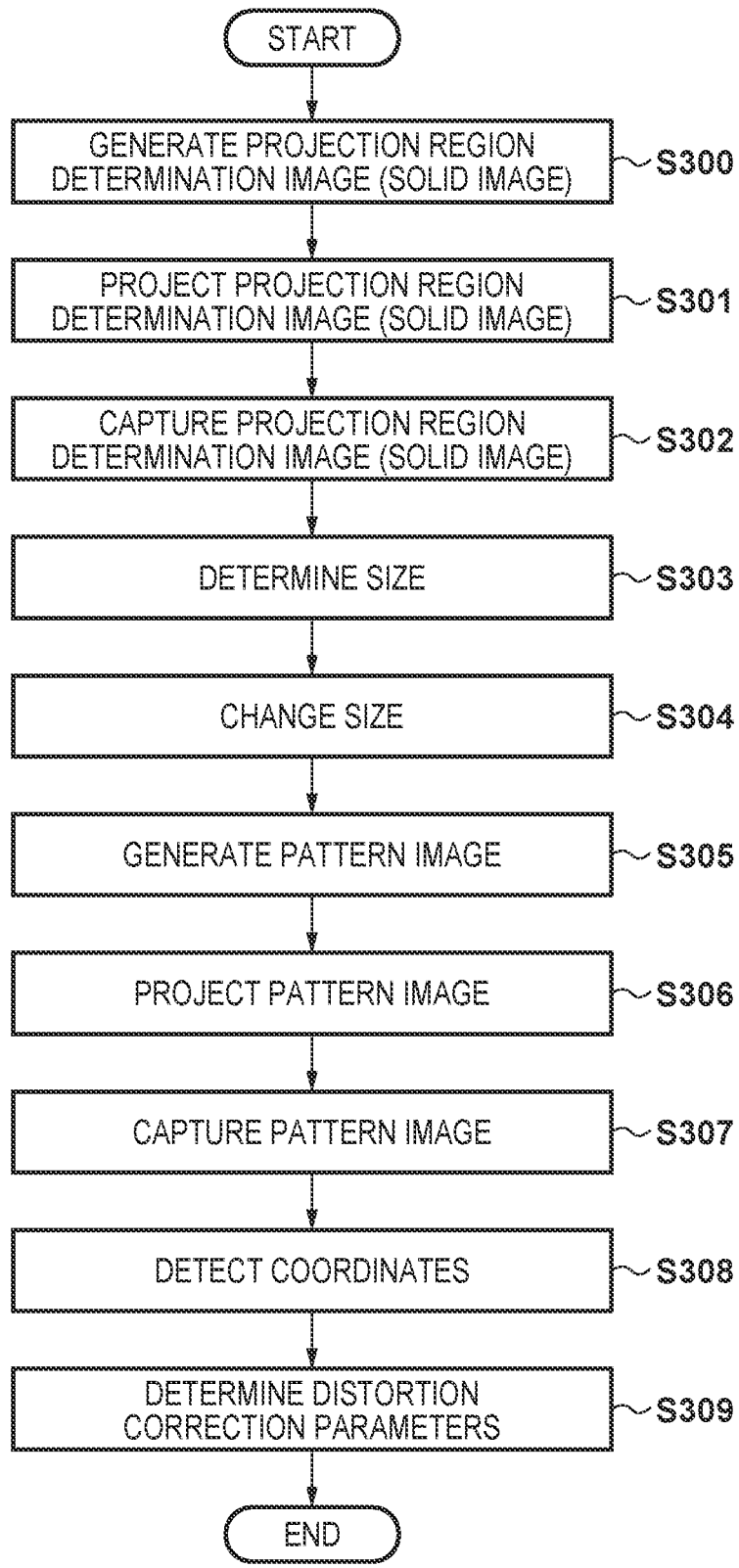
FIG. 14 is a flowchart showing an image processing procedure according to the fourth embodiment.

An outline of the above series of processing will be described next with reference to the flowchart of FIG. 14. The procedure starts in response to an instruction for distortion correction and alignment of each projection unit, which is issued by the user as a trigger via the operation unit 111.

In step S300 the control unit 110 controls a pattern-image output unit 100 to generate a projection region determination image (solid image), and causes the projection unit 101 to output the image. In step S301, the control unit 110 controls the projection unit 1011 to project the input projection region determination image onto the screen 105. In step S302, the control unit 110 controls the image capturing unit 104 to capture the projection region determination image projected on the screen 105. In step S303, the control unit 110 controls the size determining unit 107 to determine the optimal size of each specific image element (dot) from the ratio of the projection region determination image to the captured image, the projection resolution of the projection unit 101, and the image-capturing resolution of the image capturing unit 104.

In step S304, the control unit 110 causes a size changing unit 106 to add pixels, each having a predetermined gray level, around each specific image element so as to make the image element have the same size as that determined by the size determining unit 107. In step S305, the control unit 110 controls the pattern-image output unit 100 to generate a projection pattern image formed from a pattern constituted by the specific image elements each having the determined size and output the image. In step S306, the control unit 110 controls the projection unit 101 to project the projection pattern image onto the screen 105.

In step S307, the control unit 110 controls the image capturing unit 104 to capture the projection pattern image projected on the screen 105. In step S308, the control unit 110 controls the detecting unit 102 to decode and detect the coordinate information of each specific image element from the projection pattern image. In step S309, the control unit 110 controls the parameter determining unit 103 to determine distortion correction parameters from the coordinate information and supply the parameters to the projection unit 101, thereby completing distortion correction and alignment.

As described above, according to the fourth embodiment, it is possible to automatically calculate the optimal size of each specific image element without repeatedly displaying a pattern image by projecting a projection region determination image and capturing and analyzing the image before the projection of a pattern image. This makes it possible to perform accurate automatic position adjustment in a short period of time.

Fifth Embodiment

Figure 15:
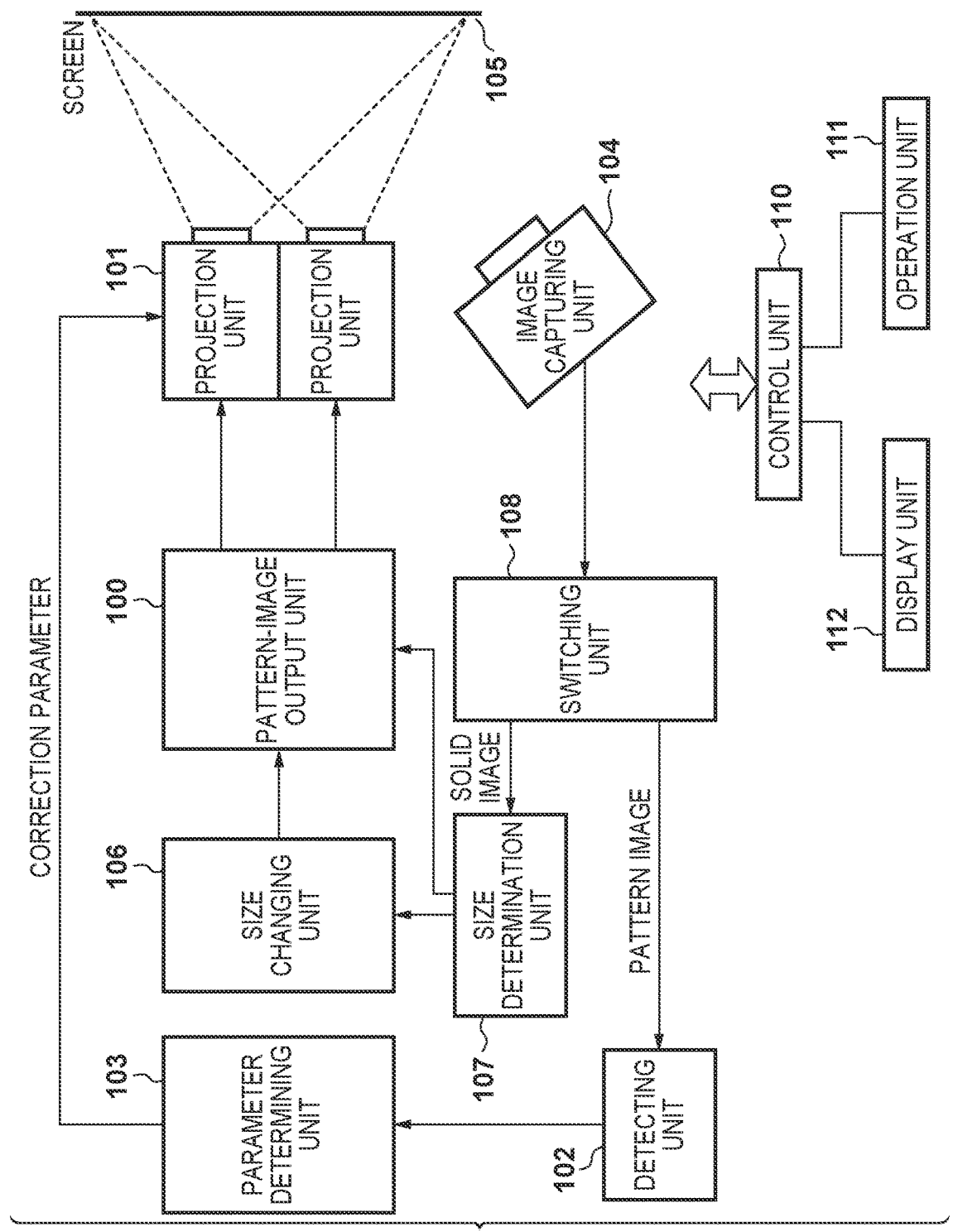
FIG. 15 is a block diagram showing the arrangement of a projection type display system according to the fifth embodiment.

FIG. 15 is a block diagram showing the arrangement of a projection type display system according to the fifth embodiment. This embodiment differs from the fourth embodiment in that a control line is connected from a size determining unit 107 to a pattern-image output unit 100. The fifth embodiment is configured to change the size of a pattern constituted by specific image elements before changing the size of each element.

Figure 16:
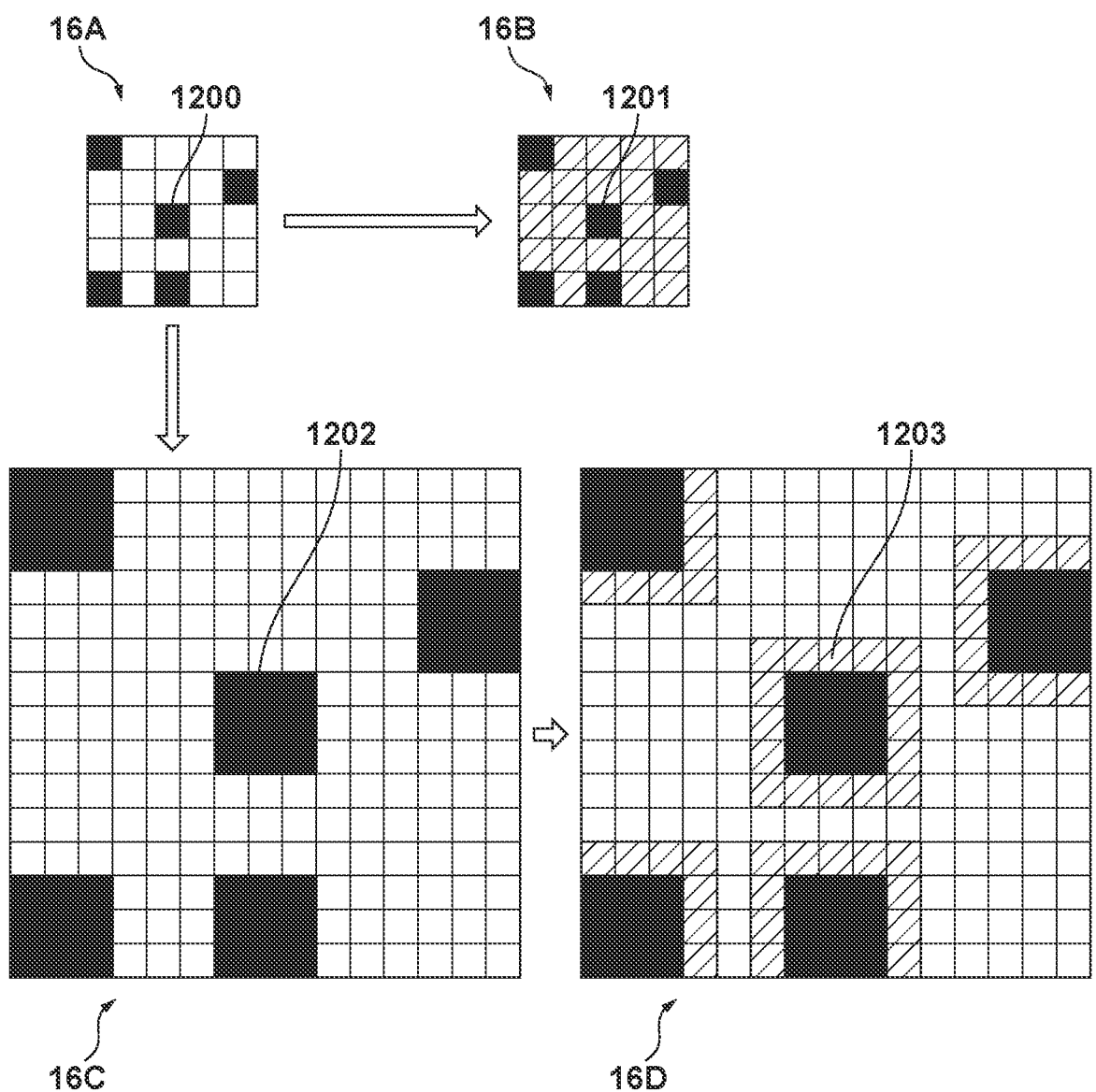
FIG. 16 explains an outline of image processing according to the fifth embodiment.

A series of processing will be described below with reference to FIG. 16. 16A in FIG. 16 shows a pattern constituted by specific image elements. When the specific image elements in the pattern are dense as shown in 16A in FIG. 16, increasing the size of each element will cause the elements to overlap. If, for example, the optimal size of each specific image element determined by the size determining unit 107 is five dots, pixels corresponding to two dots are added around a specific image element 1201 in 16B in FIG. 16 to change the size into a size of 5<5 dots indicated by a gray region. As a result, the 5×5 dots overlap black dots other than the black dot 1201. This leads to failure to properly decode the coordinate information.

In this case, if comparison between the minimum interval and optimal size of each specific image element indicates that elements overlap each other, the pattern size is changed first in the following manner. First of all, the pattern size (5 dots×5 dots) of the pattern shown in 16A in FIG. 16 is changed into a threefold pattern size (15 dots×15 dots) as shown in 16C in FIG. 16. At this time, the size of a specific image element 1200 becomes 3 dots×3 dots as indicated by reference numeral 1202. As indicated by reference numeral 1203 in 16D in FIG. 16, an image with a predetermined gray level is added around a specific image element 1202 after enlargement to increase the size of the specific image element to 5 dots, which is the optimal size. Changing a pattern size as a reference in advance in this manner to increase the intervals between specific image elements will prevent the specific image elements from overlapping each other accompanying a change in specific image element size. Note that as described in the third embodiment, the enlargement ratio of a pattern size influences the phase difference δ and the error amounts Δx and Δy. In this embodiment, a change in pattern size is limited to threefold and combined with a change in specific image element size (addition of one pixel around each element) to set the size of each specific image element to 5 dots, thereby suppressing an increase in error caused by an increase in pattern size.

Figure 17:
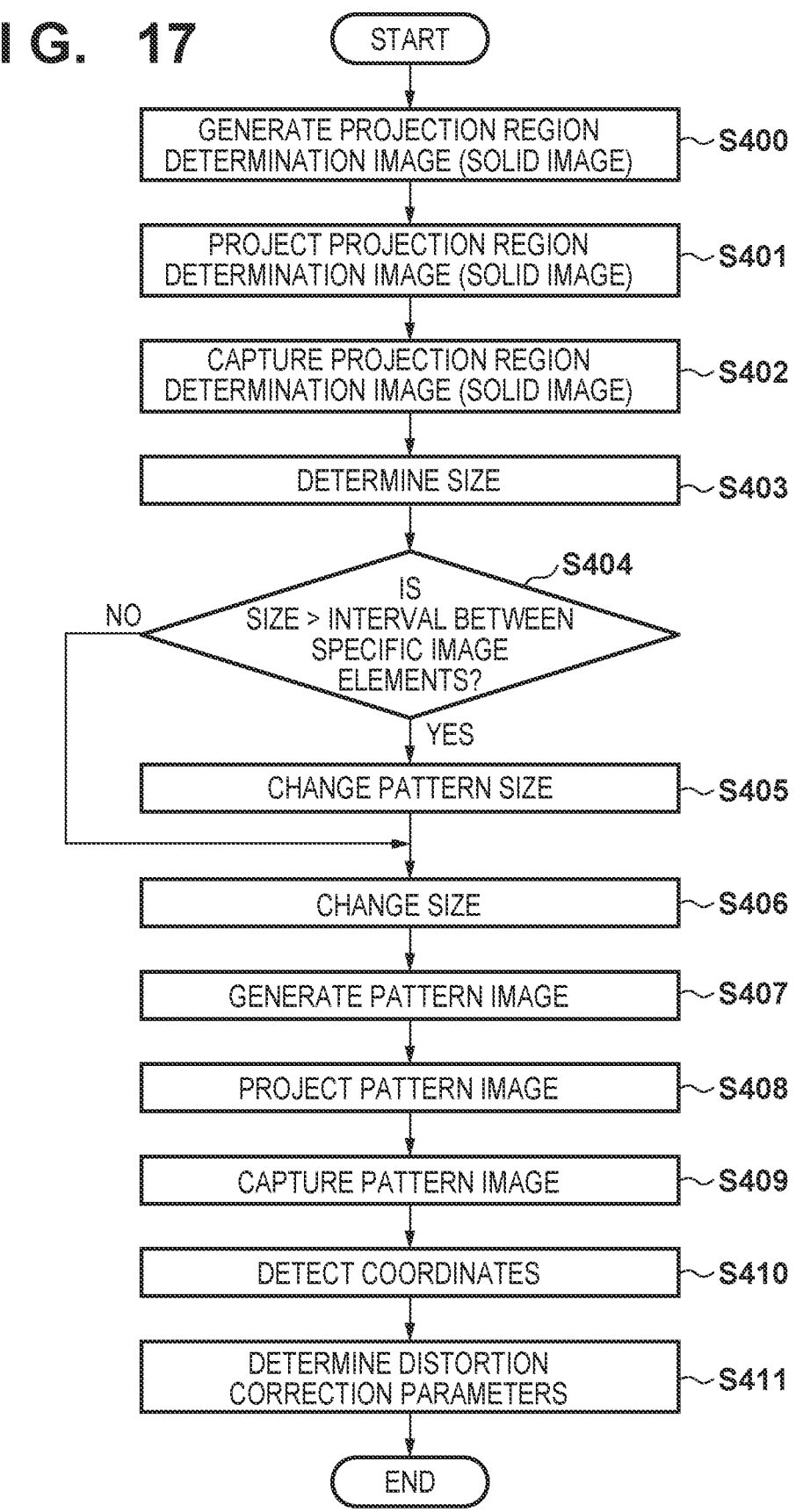
FIG. 17 is a flowchart showing an image processing procedure according to the fifth embodiment.

An outline of the above series of processing will be described next with reference to the flowchart of FIG. 17. This procedure starts in response to an instruction for distortion correction and alignment of each projection unit, which is issued by the user as a trigger via an operation unit 111.

In step S400, a control unit 110 controls a pattern-image output unit 100 to generate an image (solid image) for projection region determination and output the image to a projection unit 101. In step S401, the control unit 110 controls the projection unit 101 to project the image for projection region determination from the pattern-image output unit 100 onto a screen 105. In step S402, the control unit 110 controls an image capturing unit 104 to capture the image for projection region termination projected on the screen 105 and supply the captured image to the size determining unit 107 via a switching unit 108.

In step S403, the control unit 110 controls the size determining unit 107 to determine an optimal target size of each specific image element (dot) from the ratio of the projection region determination image to the captured image, the projection resolution of the projection unit 101, and the image-capturing resolution of the image capturing unit 104. In step S404, the control unit 110 compares the interval between specific image elements with the target size of each specific image element determined in step S403. If the target size is larger than this interval, the control unit 110 advances the process to step S405. In step S405, the control unit 110 controls the pattern-image output unit 100 to change the size of the pattern image as a reference. A comparison condition is not limited to this. If the elements are allowed to overlap to some extent, a value smaller than the interval may be set.

In step S406, the control unit 110 controls the size changing unit 106 to change the size of each specific image element by adding an image having a predetermined gray level around each specific image element. In step S407, the control unit 110 controls the pattern-image output unit 100 to generate a projection pattern image formed from a pattern constituted by specific image elements and output the projection image to the projection unit 101. In step S408, the control unit 110 controls the projection unit 101 to project the projection pattern image from the pattern-image output unit 100 onto the screen 105. In step S409, the control unit 110 controls the image capturing unit 104 to capture the projection pattern age projected on the screen 105 and supply the captured image to a detecting unit 102 via the switching unit 108. In step S410, the control unit 110 controls the detecting unit 102 to detect the coordinate information of each specific image element from the captured image. In step S411, the control unit 110 controls a parameter determining unit 103 to determine distortion correction parameters based on the coordinate information and supply the parameters to the projection unit 101 so as to set the parameters, thereby completing distortion correction and alignment.

As described above, according to the fifth embodiment, the pattern size constituted by specific image elements is changed in advance in accordance with the optimal size of each specific image element and the interval between the elements, thereby increasing the interval between the elements and preventing the elements from overlapping each other. This enables accurate automatic position adjustment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125286, filed Jun. 29, 2018, which is hereby incorporated by reference herein in its entirety.

What is claimed is:

1. An image processing apparatus that determines a correction parameter for correcting distortion or a position of an image projected on a screen by a projection unit, the apparatus comprising:
   one or more memories storing instructions, and
   one or more processors coupled to the one or more memories,
   wherein execution of the instructions causes the one or more processors to function as:
      a holding unit configured to hold a reference pattern constituted by a background region and a plurality of significant pixels scattered in the background region and having a pixel value different from a pixel value of the background region;
      a generating unit configured to generate a pattern image to be projected on the projection unit by changing a pixel value of a pixel near the significant pixel in the reference pattern;
      an acquisition unit configured to acquire a captured image obtained by an image capturing unit by capturing the pattern image generated by the generating unit so as to include a projection image projected by the projection unit; and
      a determining unit configured to determine the correction parameter from the captured image.

2. The apparatus according to claim 1, wherein the generating unit changes a pixel value of a pixel around the significant pixel to a pixel value different from a pixel value representing the background region.

3. The apparatus according to claim 1, wherein the significant pixel represents a dot in the reference pattern, and
   the generating unit generates, as the pattern image, an image by increasing a size of the dot in the reference pattern.

4. The apparatus according to claim 3, wherein the execution of the instructions further causes the one or more processors to function as a determining unit configured to determine whether the determining unit has succeeded in obtaining a correction parameter, and
   wherein if a determination result obtained by the determining unit indicates unsuccess, the generating unit generates a pattern image with the size of the significant pixel being further increased as compared with a previous size.

5. The apparatus according to claim 4, wherein if a determination result obtained by the determining unit indicates unsuccess, the determining unit determines the correction parameter again.

6. The apparatus according to claim 3, wherein the execution of the instructions further causes the one or more processors to function as a calculating unit configured to calculate a target size of the dot based on a projection range of the projection unit, and wherein the generating unit changes a pixel value of a pixel near the significant pixel to a target size calculated by the calculating unit.

7. The apparatus according to claim 6, wherein the projection range is obtained by causing the projection unit to project a white solid image and causing the image capturing unit to capture the projected white solid image.

8. The apparatus according to claim 3, wherein the execution of the instructions further causes the one or more processors to function as a calculating unit configured to calculate a target size of the dot based on at least one of resolutions of the projection unit and the image capturing unit, and wherein the generating unit changes the pixel value of a pixel near the significant pixel to a target size calculated by the calculating unit.

9. The apparatus according to claim 3, wherein the execution of the instructions further causes the one or more processors to function as a calculating unit configured to calculate a target size of the dot based on a projection range of the projection unit and resolutions of the projection unit and the image capturing unit, and wherein the generating unit changes a pixel value of a pixel near the significant pixel to a target size calculated by the calculating unit.

10. The apparatus according to claim 9, wherein the execution of the instructions further causes the one or more processors to function as a comparing unit configured to compare a target size calculated by the calculating unit with an interval between the significant pixels, and wherein when a comparison result obtained by the comparing unit indicates that the target size is larger than the interval between the significant pixels, the generating unit enlarges the reference pattern to make the interval between the significant pixels larger than the target size.

11. The apparatus according to claim 3, wherein the generating unit generates a change reference pattern by changing a size of the dot in the reference pattern and then generates, as the pattern image, an image by repeatedly arranging the change reference pattern in a tile pattern.

12. The apparatus according to claim 1, wherein the generating unit adds, near the significant pixel, a pixel having an average value of a pixel value represented by the significant pixel and a pixel value representing the background region.

13. The apparatus according to claim 1, wherein the generating unit further generates, as the pattern image, an image having a number of pixels larger than the reference pattern based on the reference pattern.

14. The apparatus according to claim 13, wherein the generating unit enlarges the reference pattern at a preset enlargement ratio.

15. The apparatus according to claim 14, wherein the generating unit generates the pattern image by changing a pixel value of a pixel around a significant pixel after the reference pattern is enlarged at the preset enlargement ratio to a predetermined pixel value.

16. The apparatus according to claim 1, wherein the execution of the instructions further causes the one or more processors to function as:

a projection control unit configured to supply the pattern image generated by the generating unit to the projection unit and project the pattern image on a screen; and an image-capturing control unit configured to cause the image capturing unit to capture the pattern image projected on the screen.

17. The apparatus according to claim 16, wherein the projection control unit causes the projection unit to project an image corrected by using the correction parameter.

18. The apparatus according to claim 1, wherein the reference pattern includes the background region having a pixel with a pixel value representing white and the significant pixel having a pixel value representing black.

19. A control method for an image processing apparatus that determines a correction parameter for correcting distortion or a position of an image projected on a screen by a projection unit, the method comprising:

holding a reference pattern constituted by a background region and a plurality of significant pixels scattered in the background region and having a pixel value different from a pixel value of the background region;

generating a pattern image to be projected on the projection unit by changing a pixel value of a pixel near the significant pixel in the reference pattern;

acquiring a captured image obtained by an image capturing unit by capturing the generated pattern image so as to include a projection image projected by the projection unit; and determining the correction parameter from the captured image.

20. A non-transitory computer-readable storage medium storing a program which, when read and executed by a computer, causes the computer to execute steps in a control method for an image processing apparatus that determines a correction parameter for correcting distortion or a position of an image projected on a screen by a projection unit, the method comprising:

holding a reference pattern constituted by a background region and a plurality of significant pixels scattered in the background region and having a pixel value different from a pixel value of the background region;

generating a pattern image to be projected on the projection unit by changing a pixel value of a pixel near the significant pixel in the reference pattern;

acquiring a captured image obtained by an image capturing unit by capturing the generated pattern image so as to include a projection image projected by the projection unit; and determining the correction parameter from the captured image.

* * * * *